(12) United States Patent
Posa et al.

(10) Patent No.: US 7,252,880 B2
(45) Date of Patent: *Aug. 7, 2007

(54) TAPE AND WRAPPING MATERIALS WITH EDGE-FINDING FEATURE

(76) Inventors: John G. Posa, 1204 Harbrooke Ave., Ann Arbor, MI (US) 48103; Ronald W. Citkowski, 1380 W. Gunn Rd., Rochester Hills, MI (US) 48306

( * ) Notice: Subject to any disclaimer, the term of this patent is extended or adjusted under 35 U.S.C. 154(b) by 24 days.

This patent is subject to a terminal disclaimer.

(21) Appl. No.: 10/876,061

(22) Filed: Jun. 24, 2004

(65) Prior Publication Data

US 2004/0234732 A1 Nov. 25, 2004

Related U.S. Application Data

(63) Continuation of application No. 09/470,452, filed on Dec. 22, 1999, now Pat. No. 6,767,628.

(51) Int. Cl.
*B32B 7/12* (2006.01)
(52) U.S. Cl. ............... 428/343; 428/906; 428/192; 206/459.1
(58) Field of Classification Search ........ 428/192, 428/906, 343, 915; 206/459.1
See application file for complete search history.

(56) References Cited

U.S. PATENT DOCUMENTS

| 3,114,417 | A |   | 12/1963 | Christensen ............... 117/33 |
|---|---|---|---|---|
| 3,537,578 | A |   | 11/1970 | Figluizzi ..................... 206/59 |
| 3,700,305 | A |   | 10/1972 | Bingham .................... 350/105 |
| 3,819,398 | A |   | 6/1974 | Powell et al. ................. 117/36 |
| 3,935,960 | A | * | 2/1976 | Cornell ...................... 220/260 |
| 4,424,911 | A | * | 1/1984 | Resnick ...................... 215/365 |
| 4,516,679 | A | * | 5/1985 | Simpson et al. ......... 206/459.1 |
| 4,913,946 | A |   | 4/1990 | Sala et al. .................... 428/38 |
| 4,986,429 | A | * | 1/1991 | Singleton, Jr. ............. 215/230 |
| 5,242,830 | A |   | 9/1993 | Argy et al. ..................... 436/5 |
| 5,326,605 | A |   | 7/1994 | Ono et al. .................... 428/40 |
| 5,340,629 | A |   | 8/1994 | Rodighiero ................. 428/40 |
| 5,474,194 | A |   | 12/1995 | Heilman et al. ............ 215/230 |
| 5,693,394 | A |   | 12/1997 | Nagai et al. .................. 428/42 |
| 5,707,482 | A |   | 1/1998 | Fusselman .................. 156/577 |
| 5,734,498 | A |   | 3/1998 | Krasieva et al. ........... 359/387 |
| 5,866,249 | A |   | 2/1999 | Yarusso et al. .............. 428/41 |

\* cited by examiner

*Primary Examiner*—Hai Vo
(74) *Attorney, Agent, or Firm*—Gifford, Krass, Sprinkle, Anderson & Citkowski, P.C.

(57) ABSTRACT

A flexible material such as a transparent tape includes a material which enhances the visibility of a newly formed edge. The material can include a fluorescent dye disposed in the tape, or can be a material which reacts with oxygen, moisture or some other component of the ambient atmosphere to render the edge more visibly evident.

12 Claims, 2 Drawing Sheets

TAPE AND WRAPPING MATERIALS WITH EDGE-FINDING FEATURE

REFERENCE RELATED APPLICATION

This application is a continuation of U.S. patent application Ser. No. 09/470,452, filed Dec. 22, 1999, now U.S. Pat. No. 6,767,628 the entire content of which is incorporated herein by reference.

FIELD OF THE INVENTION

The present invention relates generally to thin, flexible stock materials, and, more particularly, to tapes and sheets including means enabling a newly formed edge to be visually apparent, thereby enhancing the ability of a user to locate the edge on a roll of such materials.

BACKGROUND OF THE INVENTION

Modern adhesive tapes and flexible sheet materials are now mass-produced with a very high degree of uniformity, both in terms of thickness and color or transparency. As a result, without a dispenser, it is often very difficult to find the edge of such materials, particularly if allowed to fall back onto the outer surface of the roll once cut or torn for use.

Many different types of tape exhibit this frustrating problem, including mending tapes and packing tapes, particularly the clear varieties. One clever solution to this problem is disclosed in U.S. Pat. No. 3,537,578, simply entitled "TAPE." According to this patent, a piece of tape includes a continuous marking imprinted thereon, which preferably extends diagonally from one corner of the tape to the other, or, alternatively, a wavy line is used which forms part of the repeating pattern. In both cases, after the tape is formed into a roll, the free end of the tape can be plainly visualized because the continuous line is broken and separated. It is clear from the disclosure of this patent, that the concept is not intended for use with transparent tapes, since only "insulating tapes" are specifically mentioned. If applied to transparent tapes or other materials, the line might be undesirable, particularly if the layers of the material are substantially transparent.

Although certain tape structures make use of fluorescence, its use is for surface highlighting as opposed to edge-finding. Using U.S. Pat. No. 4,913,946 as an example, which is entitled "FLUORESENCE ADHESIVE TAPE FOR USE AS A HIGHLIGHTER," fluorescent ink is applied to one face of the transparent film or support base, having a layer of low-tack adhesive, allowing the removal of the material from library books, and so forth, without damaging the printed matter. U.S. Pat. No. 5,693,394, entitled "PRESSURE-ACTIVATED FLUORESCENT MARKING TAPE," includes an adhesive fluorescent coloring layer coated on a carrier, wherein, upon application of pressure on the back of the carrier, the coloring layer is transferred to a substrate. U.S. Pat. No. 5,707,482, entitled "REMOVABLE HIGHLIGHTING TAPE," adds the feature of a dispenser having a cutting edge, further evidence that the prior art does not teach or consider the use of fluorescence or other optically-activated materials as an edge-finding feature. It is a notable, and required, feature of these highlighting tapes that they are highly colored, and this precludes their use in many applications.

Although at least one patent discloses the use of colored edges for edge-finding, this is not disclosed for use with newly-formed edges, but, rather, for use in conjunction with existing edges which are not torn or cut. This particular reference is U.S. Pat. No. 5,340,629, entitled "ADHESIVE TAPE," which is directed to the translucent material having an adhesive-free colored edge, enabling a health-care worker to visually discern and manipulate a tape edge even when using protective gloves. Thus, any mechanism tending to make newly formed edges on tapes or other materials more visually apparent would be welcomed by users thereof.

SUMMARY OF THE INVENTION

This invention helps to solve problems in locating the free end or edge of tapes and other thin flexible materials through the use of a substance which causes the free end or edge to become a different color, or to glow, when cut or torn, but which does not significantly change the transparent nature of the tape. In the preferred embodiment, the substance is contained within the flexible material itself, though one or more layers may be added to the material to carry the substance.

The invention may be applied to various thin, flexible materials, including adhesive tapes, food wraps and other packaging materials, and is particularly advantageous when used in conjunction with transparent materials provided in roll form, where the free end of the material may stick to, or at least fall back onto, the outer surface of the roll, causing the edge to become otherwise difficult to locate. The invention is particularly useful when applied to clear packing tapes, which tend to be extremely transparent, and are often provided without a dispenser.

In an adhesive tape embodiment, the substance added to the material is preferably a daylight fluorescent additive, such as a fluoresce in dye. The backing material of the tape is preferably employed as a light pipe. Ambient illumination enters into the tape and is wavelength-shifted by the fluorescent dye to a highly visible, preferably monochromatic or near-monochromatic illumination, which exits through the free edge of the tape, causing it to glow. To enhance this effect, the sides of the tape, particularly if supplied in roll form, may be coated with an opaque or reflective material, enhancing internal reflections within the backing material to enhance the exiting of light through the free end. Also, one or more surfaces of the tape, or the adhesive, may be treated, or selected, to further enhance the scattering of light back into the tape.

A wide variety of backing materials may be used in such an embodiment, including, but not limited to cellophane, vinyl, polyester, and the like. Nor is the invention limited in terms of adhesive, and may exploit an entire range of adhesives from extremely tenacious to low-tack types of the kind used for Post-it® notes and tapes. Different daylight-fluorescent materials besides fluoresceins may also be used, and such alternative materials will be readily apparent to one of skill in the art.

In addition, as an alternative to the use of a light-carrying conduit, the substance used for edge-finding may be contained in microcapsules, such that when the tape or other material is cut or torn, the substance is exposed, causing it to fluoresce, become a different color, or otherwise become visually apparent; in some instances, as a result of interaction with oxygen, water, or other components of the ambient atmosphere. Thus, at least according to this embodiment, the invention is not limited to transparent or translucent materials.

DETAILED DESCRIPTION OF THE PREFERRED EMBODIMENTS

Figure 2:
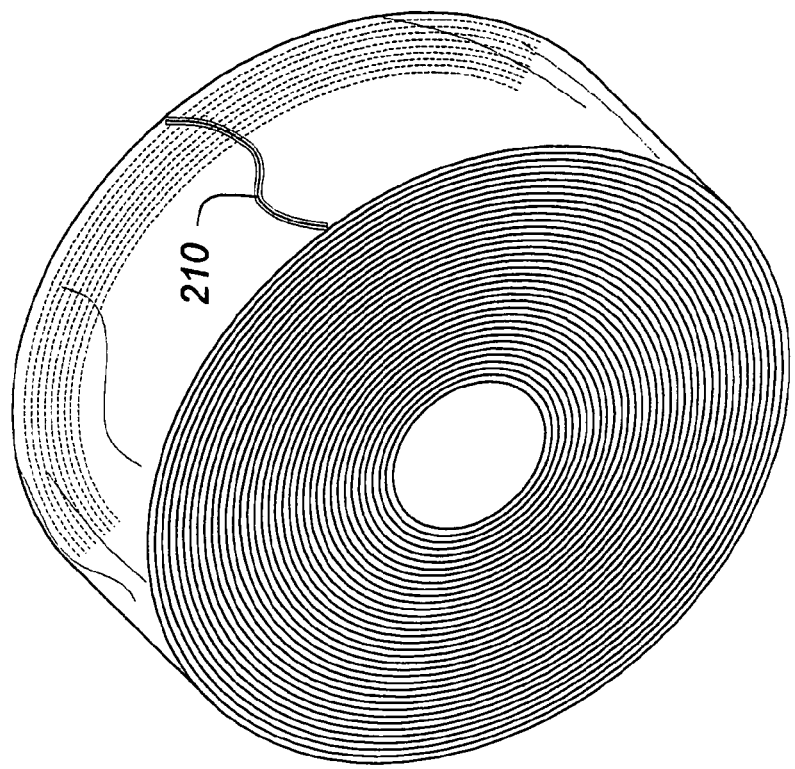
FIG. 2 is a drawing which helps to illustrate the advantages of the invention in finding the free end of the flexible sheet material, a roll of adhesive tape in this case.
Figure 1:
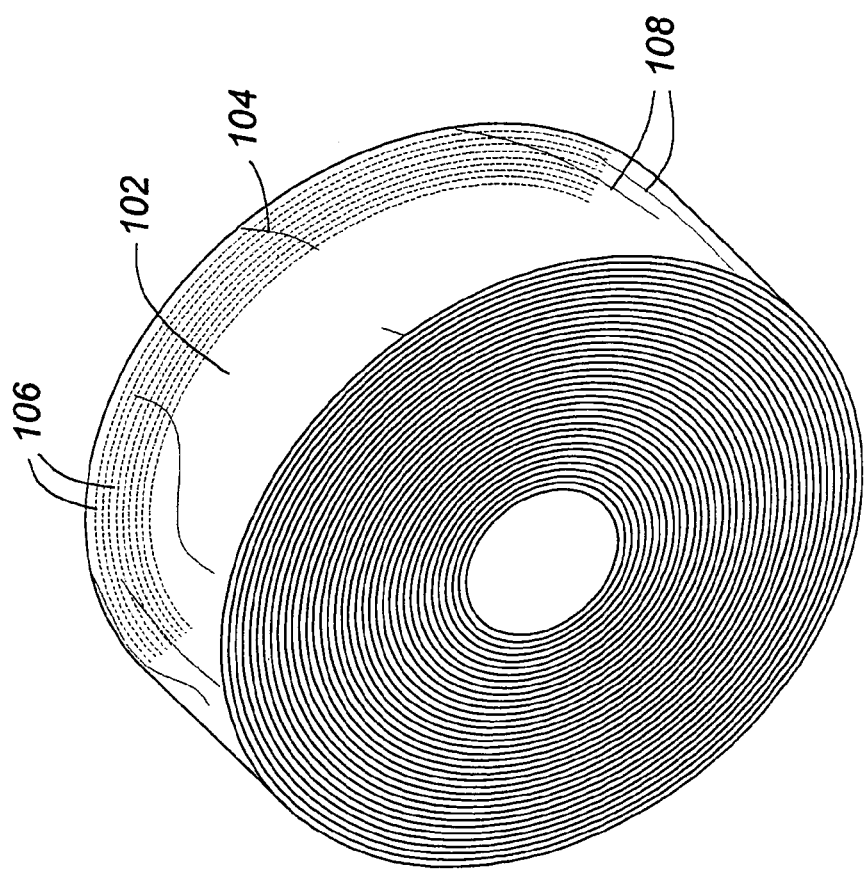
FIG. 1 is a drawing showing a prior art roll of materials, in this case, packing tape used to illustrate the problem in finding a cut or torn edge.

Making reference to the drawings, FIG. 1 illustrates, from an oblique perspective, a prior-art roll of packing tape used to illustrate the problem solved by the subject invention. The roll of tape 102, being very clear and uniform in manufacture, makes it difficult, if not impossible, to visualize the free end of the tape 104, which is obscured by the edges 106 of the tape seen through the surfaces of the tape itself, and any wrinkles or imperfections 108 which may otherwise be present. FIG. 2 illustrates, in a schematic form, the way in which the invention solves this problem, by causing the undetected edge 104 in FIG. 1 to be visually apparent as 110.

The invention anticipates various alternative means which cause the edge of an applicable material to become visibly evident, thereby enabling each newly cut or torn edge to be more easily located, particularly if the free end is allowed to fall back onto and cling to the outer surface of the roll. Although the following description concentrates on the application of the invention to adhesive tapes such as packing tapes, which typically have a width of 2" or less, it will be apparent to one of skill that the teachings are equally applicable to other types of tapes and materials having different widths and thicknesses, with or without an adhesive, including patterned and double-sided adhesives, such as plastic wrap, shrink wrap, contact paper, decals, release layers, protective sheets, laminations and overlays.

In the embodiment of a transparent adhesive tape, the base of the tape includes a daylight fluorescent material, preferably a fluoresce in dye. The base structure within which this fluorescent material is suspended also exhibits light-piping properties, and is thus capable of carrying the fluorescent emission to the edge of the tape, causing the edge to glow relative to other tape surfaces, enabling the edge of the tape to appear visually apparent. To assist in preventing the fluorescent emissions from exiting out the sides of the tape, one or both sides of the roll may be coated with a material, including a material to enhance reflections back into the base layer. For example, a reflective and/or opaque coating may be applied by spraying or otherwise to the sides of the roll once trimmed to width. Also, one or more surfaces of the tape may be texturized, further enhancing the scattering of light back into the tape.

Various materials may be utilized for the base material and adhesive layers. Plastics such as cellulose-based materials, vinyls, urethanes, polyesters and the like now currently employed for both opaque and transparent tapes may be used according to the invention or, alternatively, other materials may be employed with enhanced light-piping capabilities or indices of refraction more conducive to making the edge more conspicuous in the manner described herein. As is known in the art, the upper and/or lower surfaces of the tape may be coated or otherwise treated to further enhance light piping. Similarly, the adhesive may be any of the pressure-sensitive formulas now currently in use, or may be adjusted along with, or independent of the base layer, for example, to enhance reflection or scattering back into the base layer. As a further possibility, the adhesive may be made intentionally opaque with the base layer clear, to keep ambient light from progressing too deeply into the body of the roll, thereby localizing the inventive effect to the outermost layer(s).

It is not necessary according to the invention that the edge glow brightly or along its entire length. It is only desirable that at least a portion of the edge glow at least slightly relative to the surfaces which surround the edge to enable a user to at least get started in finding an edge once "lost." If a fluorescer is used, the fluorescent emissions may take place at all angles within the plane of the tape. Although some portion of the emission may pass out of the top, bottom, or side surfaces of the tape, sufficient emissions will be reflected back through the tape so as to emerge from the edge, enabling this edge to glow relative to the surface of the tape. As an alternative to randomly oriented emissions, if it is possible to favor emissions lengthwise along the tape, as through stretching, heat-treating, or other techniques, these could be adopted to increase radiation out the free edge. In any case, since a majority of the fluorescence will exit the edges of the tape, the tape will not manifest a significant color when viewed through its top face. In a typical, preferred embodiment of the present invention, the white light optical density of the tape will be at least 90% of that of a comparable tape which does not include the present invention.

Figure 3:
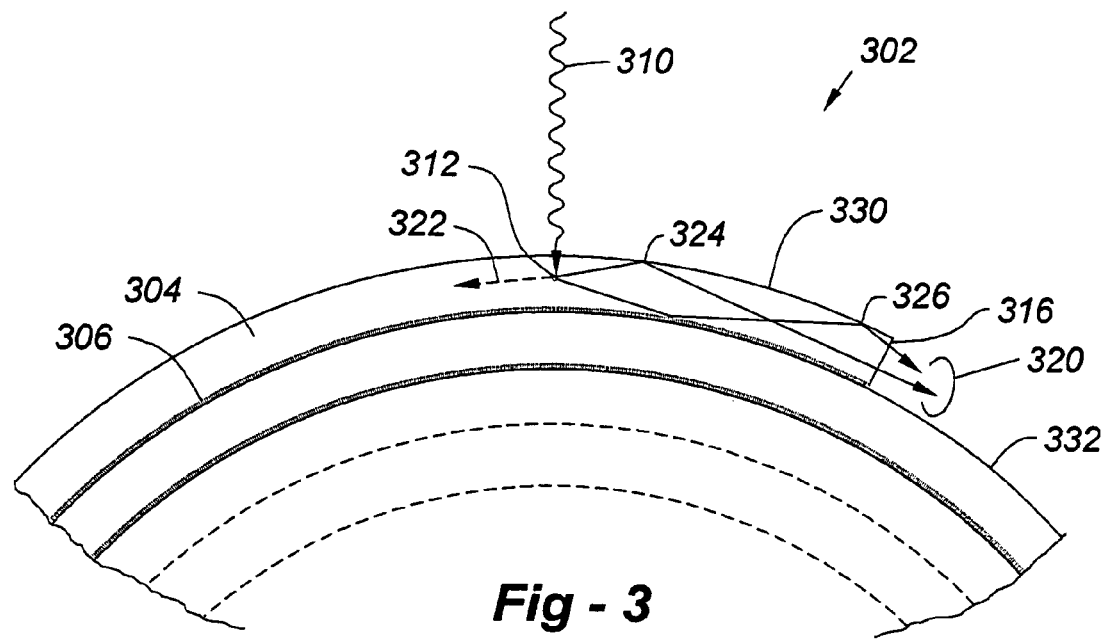
FIG. 3 is a cross sectional view of the outer layers of a roll of tape structured in accord with one embodiment of this invention.

Operation of the fluorescent embodiment of this invention will be better understood with reference to FIG. 3, which shows generally at 302 a plurality of outer layers of tape on a roll, thus taking on a curved appearance when viewed from the side. In its most basic form, the tape includes a base layer 304 and an adhesive 306 used to hold the tape against a roll and to hold the tape against a work surface when removed from the roll and applied. Although the base is shown significantly larger than the adhesive in the drawing, any other relative thicknesses and base/adhesive size ratios are possible according to the invention.

In this embodiment of the invention, a ray of incident, ambient light 310 impinges upon the outer base layer of the roll, and strikes a molecule 312 of the fluorescer disposed within the base layer 304, causing visible fluorescent emissions to emerge therefrom. At least certain of these emissions travel along the length of the tape, and emerge from the edge 316 as rays 320, thereby causing edge 316 to glow and become more visually apparent with respect to the surrounding tape surfaces. If the fluorescent emission from molecule 312 takes place at all angles within the plane of the tape, some portion of the emission may be lost, as indicated by ray 322. However, much of the emission to the right of ray 310 in FIG. 1 will be reflected back into the base layer, for example, at points 324 and 326, and emerge from edge 316, enabling edge 316 to glow relative to the surfaces 330 and 332. The advantages of the embodiment just described include affordability and ease of manufacture, since a small amount of the fluorescing material may simply be mixed with the plastic or other material used to form the base layer 304 so as to give the desired effect.

In an alternative embodiment of the invention, one or more materials may be added to the base layer and/or adhesive, or used in conjunction with the adhesive, causing a cut or torn edge to be visually evident through mechanisms other than fluorescence. As one example, a chemical agent may be added to the adhesive which, when exposed to oxygen, results in a color change causing a newly-formed edge to become visibly evident. In this embodiment, the tape roll would be formed in an oxygen-free environment, with each subsequent layer of the tape protecting the corresponding layer beneath from further oxygen exposure once removed from the environment associated with rolling the tape. During use, however, the oxygen-activated agent will be exposed to air, causing the edge remaining after a cut or tear to change color, thus indicating the tape edge. Preferably, an oxygen-activated material such as a leucodye is used as the chemical additive, though any other agents which change color upon exposure to air may alternatively be utilized for this purpose, including pure metals having a visibly evident oxidized state.

One disadvantage with this alternative embodiment is that the entire adhesive surface of the tape may discolor when removed from the roll prior to adhering the tape to a work surface. An advantage, however, is that the tape may be opaque, since oxygen, rather than light, is responsible for causing the exposed edge to become evident. Thus, this alternative may be used in conjunction with translucent or even opaque tapes such as colored packing tapes, black electrical tapes, and so forth.

Figure 4:
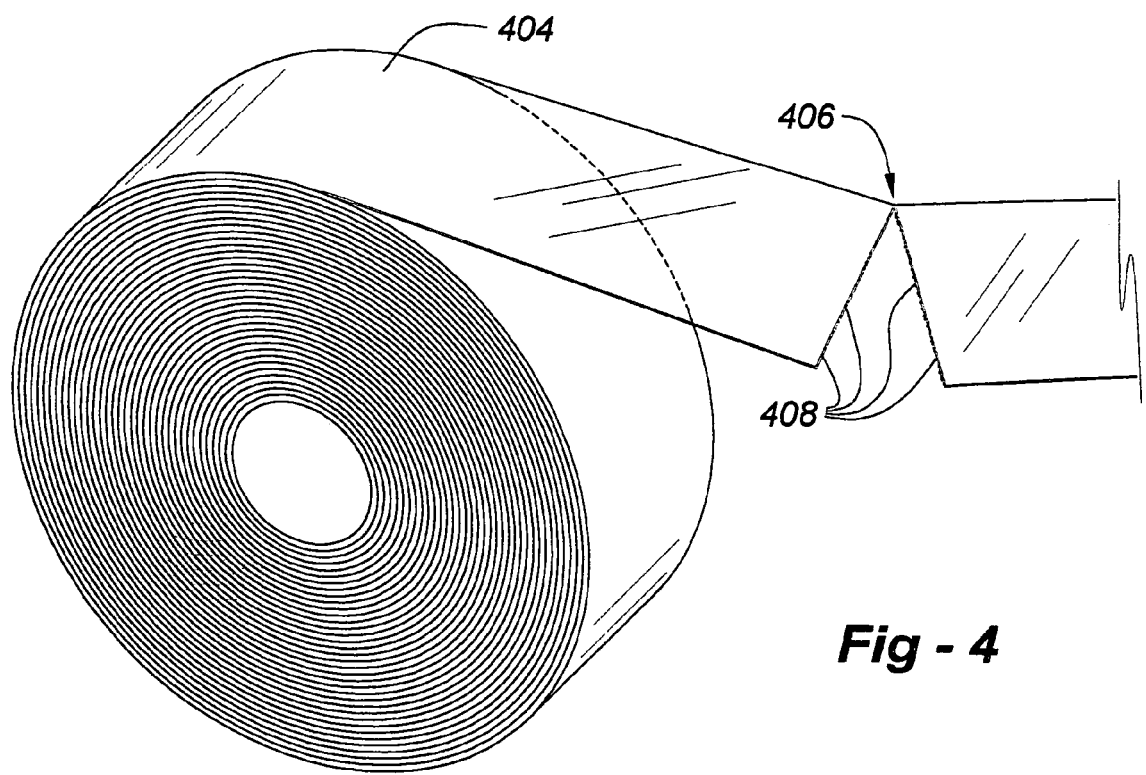
FIG. 4 is an oblique view of a roll of tape illustrating another embodiment of this invention.

As a further alternative embodiment, color-changing compounds may instead be contained within microcapsules, preferably applied to the adhesive side of the tape base. As such, when the tape is cut, torn or severed, microcapsules are broken, enabling a material which discolors to flow therefrom. Such a material may be of various alternative types, including high-intensity dyes, materials which discolor upon contact with another material in the adhesive, or materials such as those mentioned above, which discolor upon exposure to oxygen. FIG. 4 depicts one such embodiment. As shown therein, when the tape 404 is cut or severed at point 406, microcapsules 408 (shown enlarged) are broken to release a visibly apparent material.

An advantage of the microencapsulation technique is that the entire adhesive surface of the tape will not become discolored as in the alternative embodiment described above, and thus may be more suitable to transparent tapes. Additionally, if the microcapsule contents are of the type which discolor upon mixing with other materials of the adhesive layer, visually evident markings may be written on the tape once set in place, simply by using a relatively hard stylus, fingernail or other object which would result in the breakage of the microcapsules beneath the base layer. In yet another embodiment, the foregoing microcapsules may be disposed directly in the tape base.

Having thus described our invention, we claimed:

1. A stock material, comprising:
   a substantially thin, flexible adhesive tape having a first coloration; and
   a substance within the adhesive tape which, when the tape is cut or torn to produce an edge, causes the edge to assume a second coloration different from the first coloration, thereby assisting a user in finding the produced edge.

2. The material of claim 1, wherein the substance is fluorescent.

3. The material of claim 1, further including a plurality of microcapsules which release the substance when the adhesive tape is cut or torn.

4. The material of claim 1, wherein the adhesive tape is substantially transparent.

5. The material of claim 1, wherein the adhesive tape is composed of a polymer selected from the group consisting of: polyesters, polyvinyls, cellulosic polymers, polyvinylidenes and combinations thereof.

6. The material of claim 1, wherein the amount of the substance is such that the white light optical density of the material is at least 90% of what the white light optical density of the material would be in the absence of the substance.

7. A stock material, comprising:
   a substantially thin, flexible adhesive tape having a first color intensity; and
   a substance within the adhesive tape which, when the sheet is cut or torn to produce an edge, causes the edge to assume a second color intensity greater than the first color intensity, thereby assisting a user in finding the produced edge.

8. The material of claim 7, wherein the substance is fluorescent.

9. The material of claim 7, further including a plurality of microcapsules which release the substance when the adhesive tape is cut or torn.

10. The material of claim 7, wherein the adhesive tape is substantially transparent.

11. The material of claim 7, wherein the adhesive tape is composed of a polymer selected from the group consisting of: polyesters, polyvinyls, cellulosic polymers, polyvinylidenes and combinations thereof.

12. The material of claim 7, wherein the amount of the substance is such that the white light optical density of the material is at least 90 percent of what the white light optical density of the material would be in the absence of the substance.

* * * * *